United States Patent [19]
Musk et al.

[11] Patent Number: 6,148,260
[45] Date of Patent: *Nov. 14, 2000

[54] INTERACTIVE NETWORK DIRECTORY SERVICE WITH INTEGRATED MAPS AND DIRECTIONS

[75] Inventors: Elon Musk, Mountain View; Maurice J. Fitzgerald, II, San Bruno, both of Calif.

[73] Assignee: Zip2, Palo Alto, Calif.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/342,487

[22] Filed: Jun. 29, 1999

Related U.S. Application Data

[63] Continuation of application No. 08/745,868, Nov. 8, 1996, Pat. No. 5,944,769.
[51] Int. Cl.$^7$ ............ G01C 21/00; G06F 13/38; G06F 17/30
[52] U.S. Cl. ............ 701/200; 709/203; 709/217
[58] Field of Search ............ 701/201, 203, 701/209, 211, 200; 340/995, 990, 993; 395/200.47, 200.49; 709/203, 219

[56] References Cited

U.S. PATENT DOCUMENTS

| | | | |
|---|---|---|---|
| 5,428,546 | 6/1995 | Shah et al. | 364/449 |
| 5,543,789 | 8/1996 | Behr et al. | 340/995 |
| 5,559,707 | 9/1996 | Delorme et al. | 364/443 |
| 5,682,525 | 10/1997 | Bouve et al. | 395/615 |
| 5,737,533 | 4/1998 | De Hond | 395/200.49 |
| 5,802,492 | 9/1998 | Delorme et al. | 701/200 |

OTHER PUBLICATIONS

Mapquest Website; Geosystems Global Corporation; Copyright 1996–1998.

*Primary Examiner*—Michael J. Zanelli
*Attorney, Agent, or Firm*—Townsend and Townsend and Crew LLP

[57] ABSTRACT

The present invention provides a network accessible service which integrates both a business directory and a map database. A user can search the business directory in a variety of methods, including using aspects of the map database (i.e., a radius) to quantify the search. The user can then obtain directions from a specified user location to a selected search result. All of this is conveniently accomplished through a single website access.

16 Claims, 6 Drawing Sheets

INTERACTIVE NETWORK DIRECTORY SERVICE WITH INTEGRATED MAPS AND DIRECTIONS

This appln is a con't of Ser. No. 08/745,868 filed Nov. 8, 1998, U.S. Pat. No. 5,944,769.

BACKGROUND OF THE INVENTION

The present invention relates to directory services provided over a network, in particular the Internet.

The Internet is rapidly becoming a resource people turn to for a number of services. In particular, a number of business directory services have been established on the Internet, replacing the traditional business directories distributed by telephone companies. Such business directories allow a user to look up a particular business using the Internet.

In addition, other sites on the Internet provide map services for a variety of purposes. Some sites can simply store a large number of maps which the user can view. Other sites for a particular business or operation will often include a map showing their location. Some of these may provide directions to the location of the business in response to a user input.

In addition to the Internet, maps are now being provided in some cars, using, for example, global positioning satellites to determine a car's location. A user can input a query and receive directions from the user's location to a particular location to which the user wants to drive.

SUMMARY OF THE INVENTION

The present invention provides a network accessible service which integrates both a business directory and a map database. A user can search the business directory in a variety of methods, including using aspects of the map database (i.e., a radius) to quantify the search. The user can then obtain directions from a specified user location to a selected search result. All of this is conveniently accomplished through a single website access.

In one aspect of the invention, a map is transmitted to the user as raster data. The directions between the user location and the desired destination are transmitted as vector data. The vector data is calculated using road intersections as vector points in a desired route calculated from the map database. At the user terminal, the vector data is then overlaid on the raster data to provide a display of the preferred route on the raster map.

In another aspect of the invention, a map is transmitted with both graphical information and ASCII text. The ASCII text is encoded into either a few lines of pixels of the raster map, or in unused colors throughout the map. This encoding allows the map with its text to more easily propagate through Java.

For a further understanding of the nature and advantages of the invention, reference should be made to the following description taken in conjunction with the accompanying drawings.

DESCRIPTION OF THE PREFERRED EMBODIMENT

Figure 1:
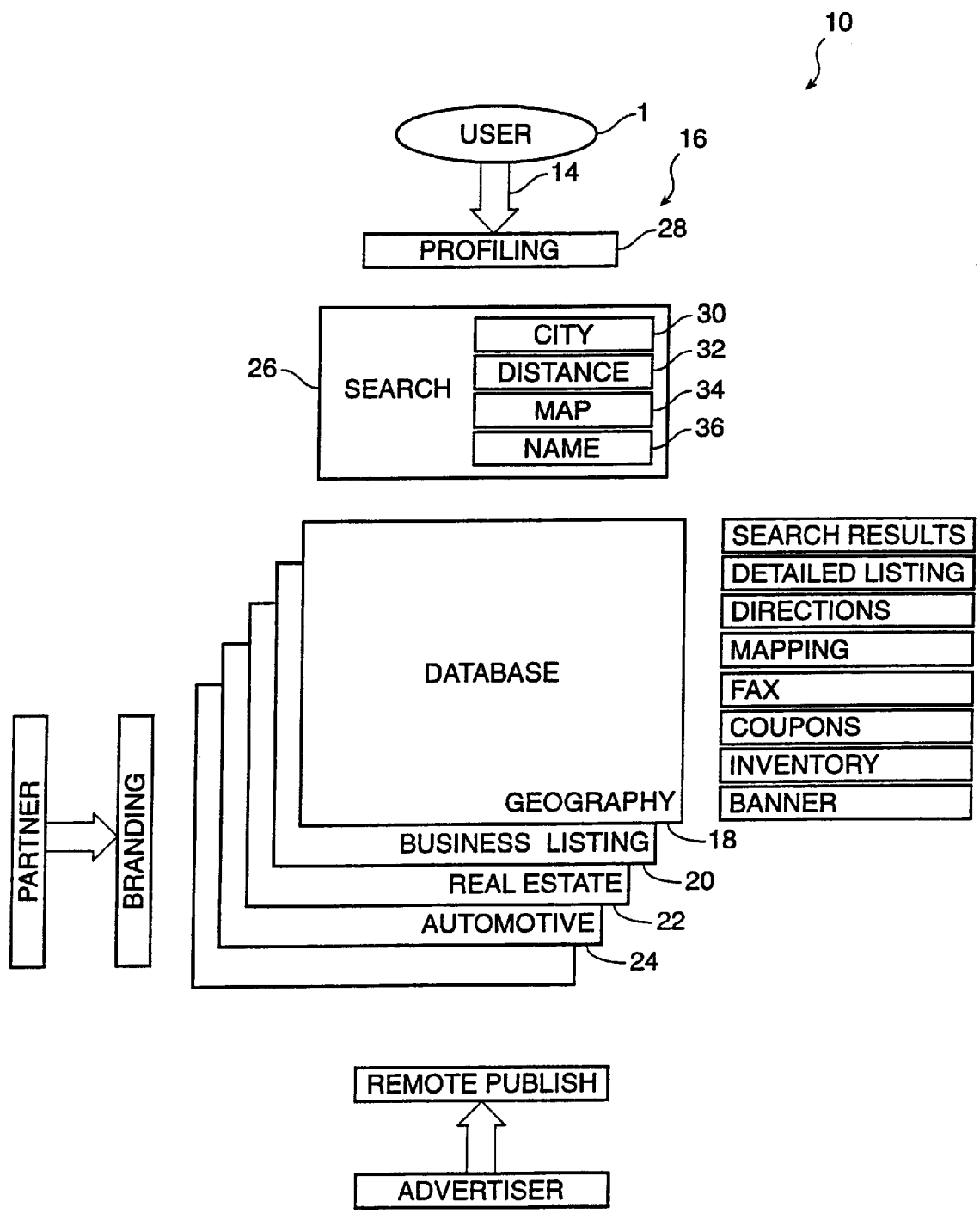
FIG. 1 is a block diagram of the different database and software modules used in the present invention.

FIG. 1 is a block diagram of a system 10 according to the present invention. A user computer system 1 interfaces over an Internet link 14 to the software and database central server system 16 of the present invention. The databases include a geography or map database 18 and an associated business listing database 20. Specialty business listing databases may be added which include additional information, such as a real estate database 22 or an automotive database 24.

The basic user interfaces to this database are a search engine 26 and profiling software 28. The search engine allows searches to be done by a number of methods. First, the search can be done by a particular city or state 30. Alternately a distance or radius 32 can be used. In another embodiment, a routine 34 allows an area defined on a map, such as by dragging a rectangle on a map, to be used to set the search bounds. Finally, a search routine using a specified name 36 might be used.

Profiling software 28 allows the user to store previously entered information about the user's preferences and other user data. For example, the user location can be stored, eliminating the need to recalculate it each time for determining a direction to different business locations. In addition, certain preferred user search strategies or methods could be set forth in a profile. The user can also specify multiple starting locations, such as a home address or an office address and such things as a preferred distance from either location for most searches.

Figure 2:
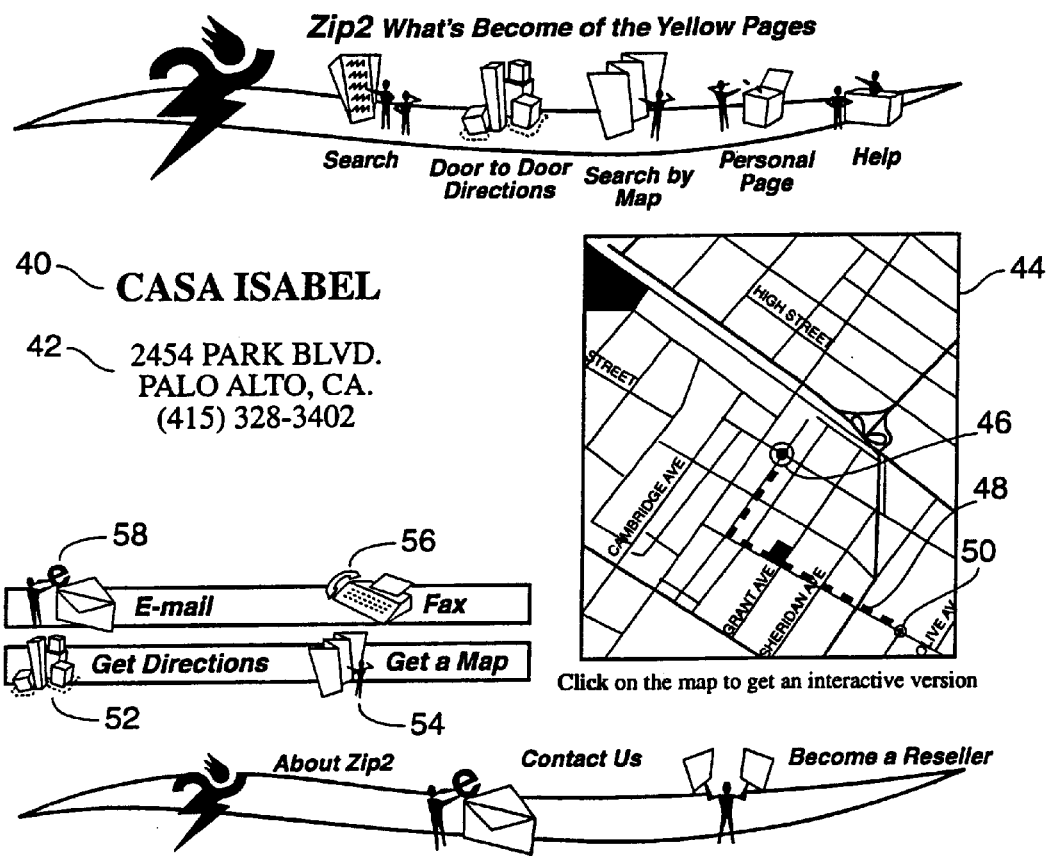
FIG. 2 is a diagram of a typical user display showing a search result and accompanying map with vector overlaid route information.

FIG. 2 illustrates a user display in response to a search. The business location searched for is first displayed at position 40, followed by its address 42. A map 44 shows the location 46, with an illustrated route 48 from a starting location 50.

Icons are provided for allowing a user to click and get directions (52), get directions in map format (54), fax the business (56), and E-mail the business (58).

Figure 3:
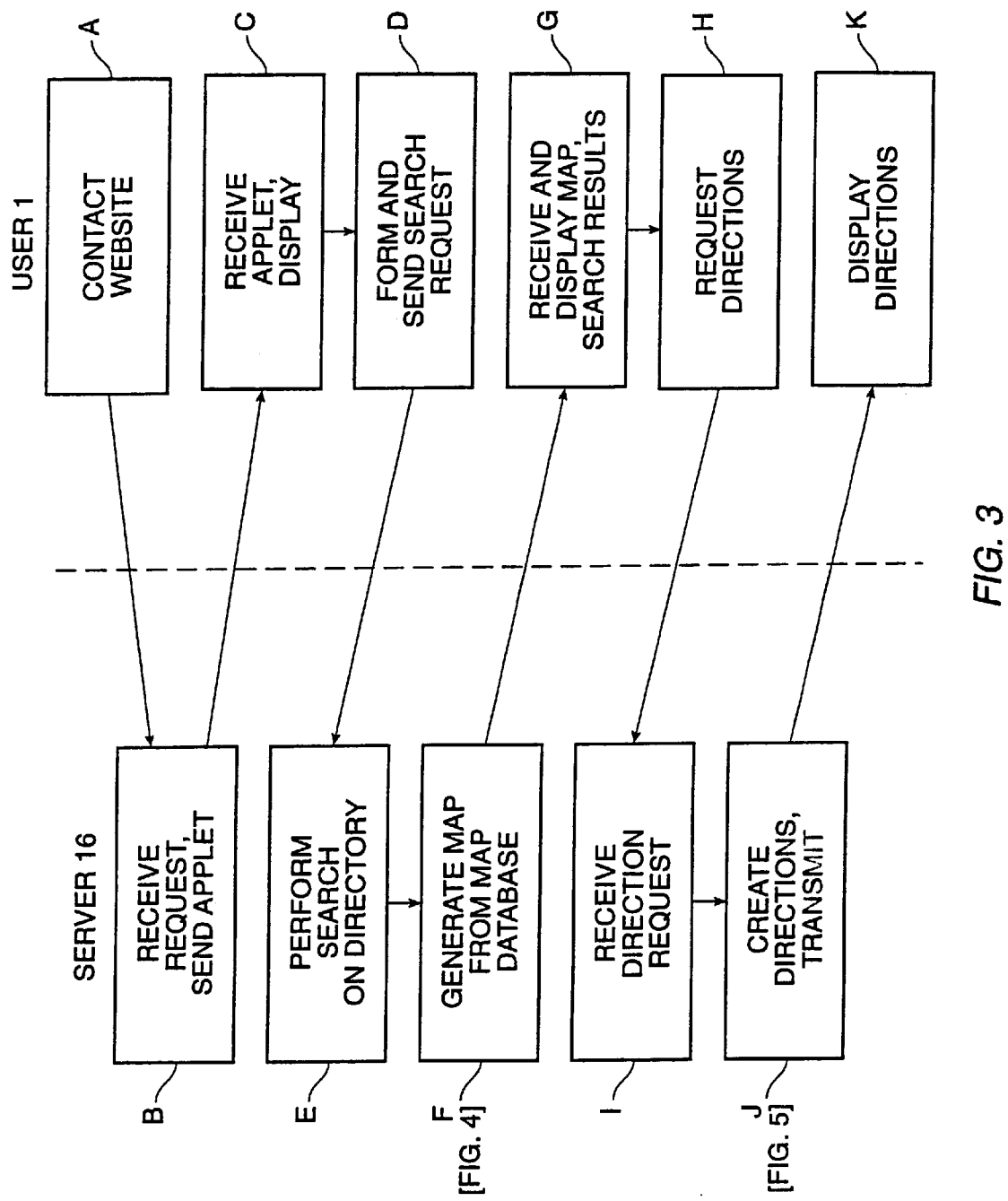
FIG. 3 is a flowchart illustrating the interactions between a client and a server for a search and map generation according to the invention.

FIG. 3 is a flowchart illustrating the operation of the present invention from both the user side 1 and the server 16. A user first contacts the server website (step A). The contact is acknowledged and a search client (e.g., a Sun Microsystems Java applet or a Microsoft activeX) is sent back to the user (step B). The user receives the applet (step C) and may initiate a search request (step D). The search request is then transmitted to server 10, and a search is performed (step E).

Upon completion of the search, a routine (step F) is run to generate the map, which is then sent to the user. The map may typically be centered around the location identified in the search. If multiple locations are identified, in one embodiment the map is basically the smallest map that will include all locations. The search of the business directory database will turn up a location, which is used with the map database to identify map coordinates corresponding to that location. In particular, a street address of a business location may be used as an input to search software associated with the map database. In one embodiment, images from the directory database may be sent along with the map, such as advertising material or a business logo.

Figure 4:
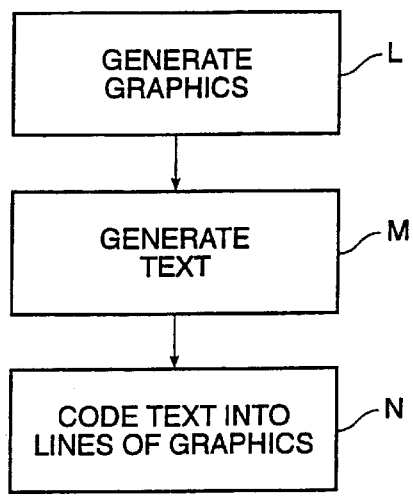
FIG. 4 is a flowchart of the map generating routine of FIG. 3.

The map generation routine is shown in more detail in FIG. 4. When the user receives the map (step G), the user can request directions (step H). This request is then sent back to the server, which receives the request (step I) and, if a map of directions is requested, will create a route and overlay it on the map in a routine shown as step J, described in more detail in FIG. 5. Finally, the map with the displayed route is sent to the user and displayed (step K).

The map can be generated and transmitted at different times in different embodiments, and depending on the mode selected by the user. For instance, the map could be sent first, and then the user could do a search on the map and have a direction route subsequently sent. Alternated, a business listing search could be done first without the map, and the map could be transmitted at the same time as the route. In another possible embodiment, the directions could be provided first in textual form, and then the user could request a map with the route displayed.

FIG. 4 illustrates the routine as step F in FIG. 3 for generating the map with text. First, in step L, the map image is generated using a format such as GIF. Next, the text to displayed on the map is generated (step M). Finally, the text is encoded into the pixels of the graphics, along with the desired location, in step N.

In one embodiment, a first line of 162 pixels may be used to encode the text information. Alternately, two lines may be used. This limited number of lines will still be visible to the user, but will look like a border and not detract from the image displayed.

In one embodiment, the text can be simply an indication of the location on the map to produce an icon symbolizing the desired business location. The first two bits of the pixel line could indicate a key as to whether the encoding is done as black and white pixels, or a particular color component. In one embodiment, five words of 32 bits are used, with the words indicating the latitude and longitude in two levels of fineness (i.e., minutes and seconds) to pinpoint the location where an icon can be displayed.

In an alternate embodiment, color pixels could have certain colors dedicated for providing text information, with the colors being chosen so that the displaying of these colors in combination with the map does not adversely affect the display on the map other than, perhaps, giving it a slight texture tint. In this manner, much more information can be transmitted, if desired.

One advantage of such a transmission technique is that the Java software used in a browser such as the Netscape browser will block text from passing with a GIF file. Thus, this provides a simple method for providing the text with the image.

Figure 5:
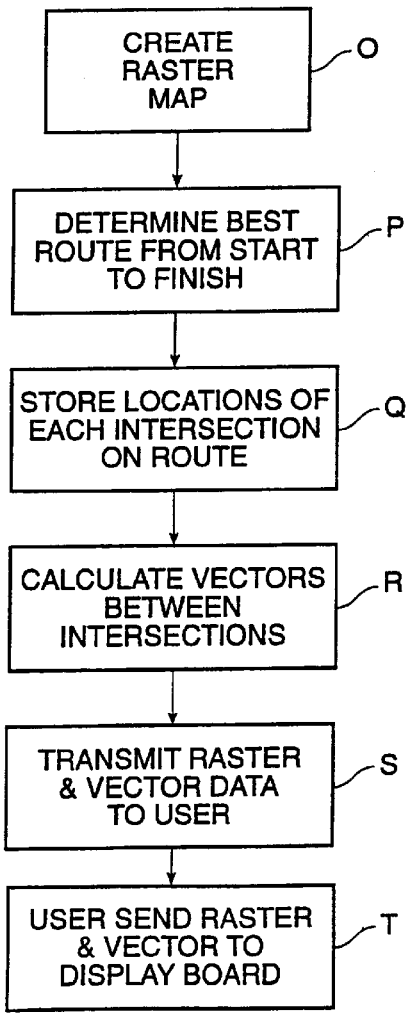
FIG. 5 is a flowchart of the routine for overlaying a route on a map referred to in FIG. 3.

FIG. 5 is a flowchart illustrating the overlaying of a vector route on a raster map as set forth in step J of FIG. 3. First, a raster map is created (step O). Next, a best route is determined using software associated with the map database (step P). Next, the location of each intersection along the route is noted in XY space (step Q). Vectors inbetween the XY coordinates along intersection are then calculated. If two intersections are along the same vector line, a single vector can be used to express the route along a particular road through multiple intersections, if there is no bend in the road. When the vectors are calculated, they are then transmitted to the user (step S).

In one embodiment, the vectors are described with a series of points each described by a latitude and longitude. These points are provided at each direction change of a road, whether at an intersection or not. At the user end, this is converted into pixels, with lines drawn between the points to generate additional pixels, if needed. These pixel values are then used to overwrite the corresponding pixels in the raster map image in a frame buffer before being displayed on a users monitor.

A user desiring to scale a map, such as by zooming, will obtain a new map from the central server. However, a new route need not be transmitted. The existing route, since it is described in vector (or "connect-the-dots") format, can be scaled by the amount the map is scaled, and superimposed on the new map.

Figure 6:
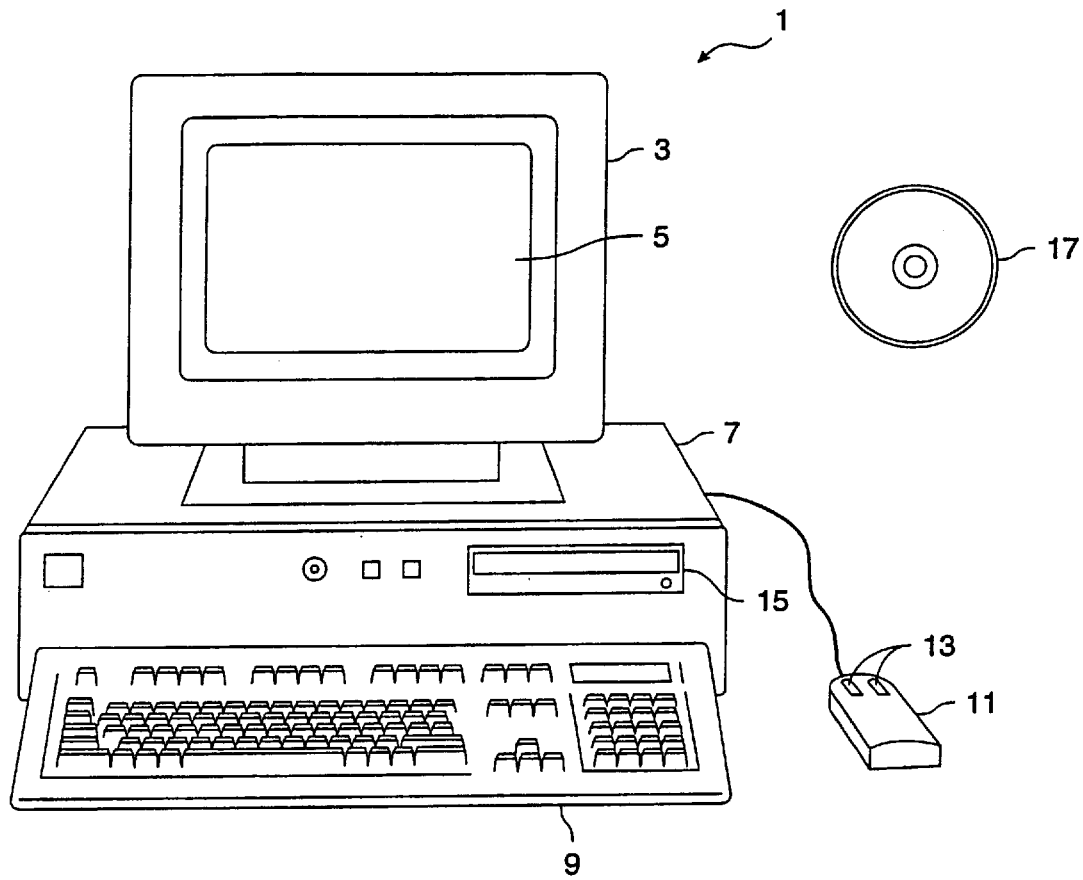
FIG. 6 is an example of a computer system used to execute the software of the present invention on the user side.

FIG. 6 illustrates an example of a computer system used to execute the software of the present invention on the user side. FIG. 6 shows a user computer system 1 which includes a monitor 3, screen 5, cabinet 7, keyboard 9, and mouse 11. Mouse 11 may have one or more buttons such as mouse buttons 13. Cabinet 7 houses a CD-ROM drive 15 or a hard drive (now shown) which may be utilized to store and retrieve software programs incorporating the present invention, and the like. Although a CD-ROM 17 is shown as the removable media, other removable tangible media including floppy disks, tape, and flash memory may be utilized. Cabinet 7 also houses familiar computer components (not shown) such as a processor, memory, and the like.

Figure 7:
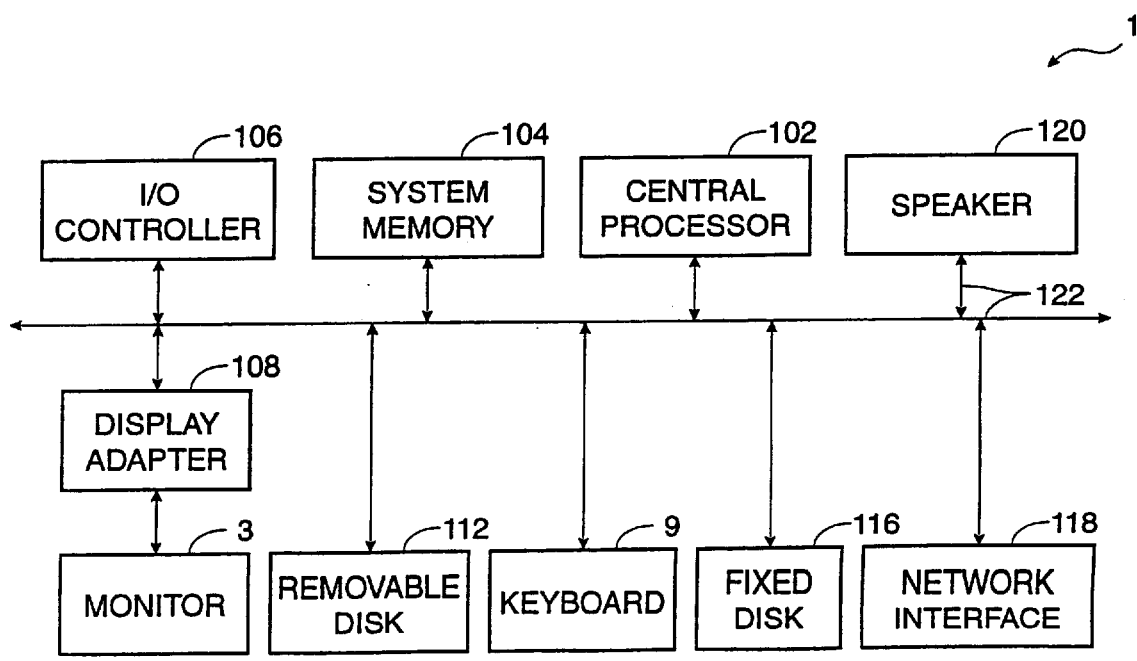
FIG. 7 is a system block diagram of the computer system.

FIG. 7 shows a system block diagram of computer system 1. As in FIG. 6, computer system 1 includes monitor 3 and keyboard 9. Computer system 1 further includes subsystems such as a central processor 102, system memory 104, I/O controller 106, display adapter 108, removable disk 112, fixed disk 116, network interface 118, and speaker 120. Other computer systems suitable for use with the present invention may include additional or fewer subsystems. For example, another computer system could include more than one processor 102 (i.e., a multi-processor system) or a cache memory.

Arrows such as 122 represent the system bus architecture of computer system 1. However, these arrows are illustrative of any interconnection scheme serving to link the subsystems. For example, a local bus could be utilized to connect the central processor to the system memory and display adapter. Computer system 1 shown in FIG. 7 is but an example of a computer system suitable for use with the present invention. Other configurations of subsystems suitable for use with the present invention will be readily apparent to one of ordinary skill in the art.

Figure 8:
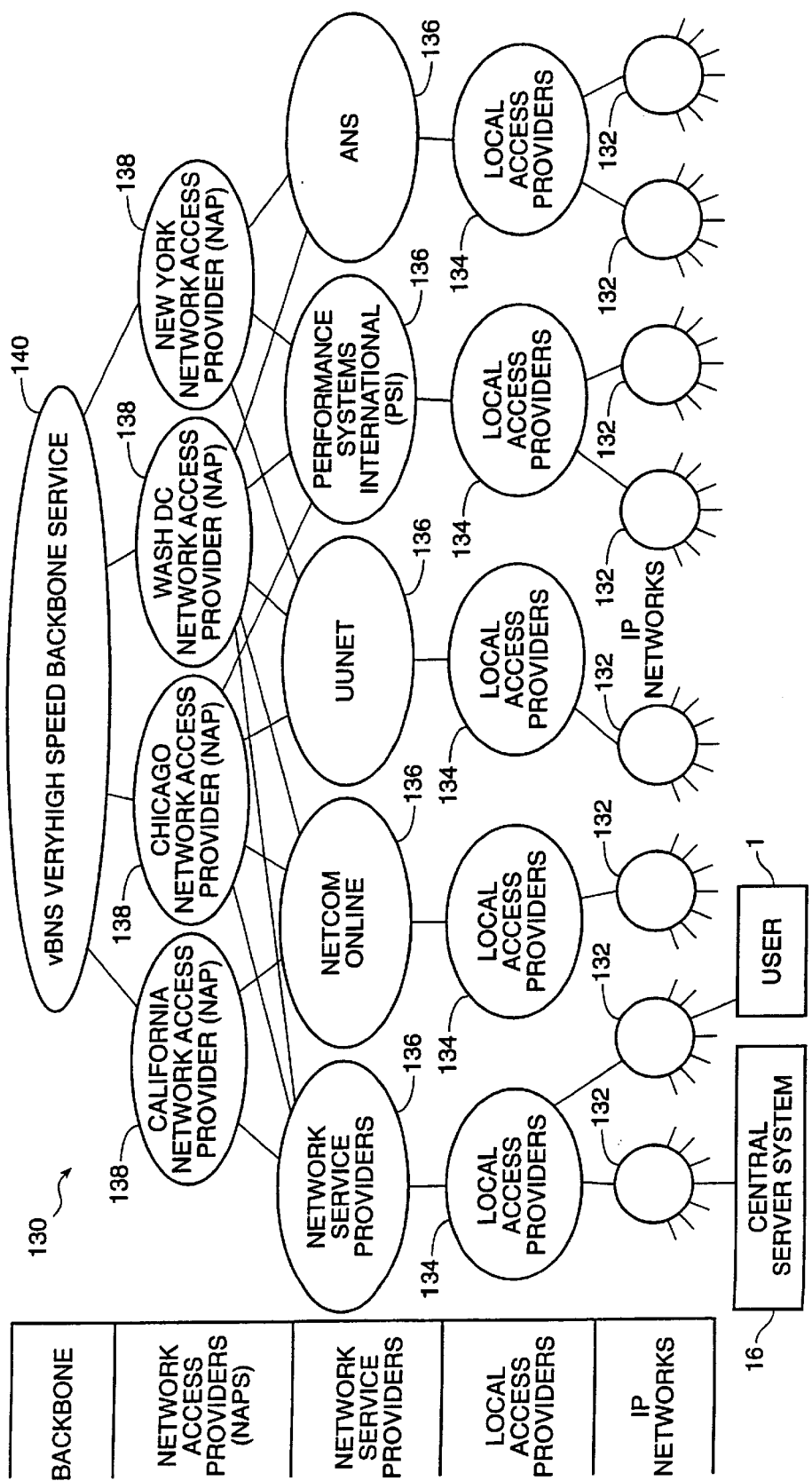
FIG. 8 is a block diagram of the Internet to which a central server system can attach to a user.

FIG. 8 is a block diagram of the Internet 130 to which a central server system 16 according to the present invention can attach to a user, such as user 1. In the example shown, a number of Internet provider networks 132 provide connection to local access providers 134, which then provide access to network service providers 136. The network service providers then connect to network access providers 138, which, in turn, are connected to the backbone service 140. It should be understood that other configurations of the Internet or other networks could be used with the present invention.

As will be understood by those of skill in the art, the present invention may be embodied in other specific forms without departing from the spirit or essential characteristics thereof. For example, the present invention can be applied to a network other than the Internet, using protocols other than TCP/IP, such as an asynchronous transfer mode (ATM) protocol. Accordingly, the preceding description is intended to be illustrative, but not limiting, of the scope of the invention which is set forth in the following claims.

What is claimed is:

1. A method of faxing a document, comprising:

storing business information in a database, the business information including business names, corresponding locations, and corresponding fax numbers;

receiving a user query having at least a portion of a business name;

identifying from the database a first business name, a corresponding first location, and a corresponding first fax number satisfying the user query;

displaying a map including the first location;

displaying an indicator on the map at the first location identifying the first business name;

receiving a request to fax the document to the first business name; and faxing the document to the first business name using the first fax number.

2. The method of claim 1 wherein the user query includes a second business name, and the method further comprises:

identifying from the database a second location corresponding to the second business name; and displaying directions from the first location to the second location on the map.

3. The method of claim 2 wherein the directions comprise a listing of streets and turns to be made on the streets.

4. The method of claim 1 wherein the business information further includes information selectable from coupon information, inventory information, and banner information corresponding to the business names.

5. The method of claim 1 wherein the map comprises a graphical file wherein a portion of the graphical file contains encoded text information.

6. The method of claim 1 wherein the encoded text information is encoded into one of a group of pixels for graphical information and a group of pixels for non-graphical information.

7. The method of claim 5 wherein at least one bit of a pixel line indicates whether the text information is encoded in a group of black or white pixels or color pixels.

8. The method of claim 7 wherein the pixels have certain colors dedicated for providing text information, the colors being chosen such that the displaying of the colors in combination with map does not adversely affect the display on the map.

9. The method of claim 1 further comprising setting search bounds for an area on the map by dragging a rectangle on the map.

10. The method of claim 1 wherein the database comprises advertising material which is displayed along with the map.

11. The method of claim 1 wherein the indicator on the map at the first location identifying the first business name comprises a business logo associated with the first business name, the business logo being stored in the database.

12. A method of electronically mailing information, comprising:

storing business information in a database, the business information including business names, corresponding locations, and corresponding electronic mail address information;

receiving a user query having at least a portion of a business name;

identifying from the database a first business name, a corresponding first location, and a corresponding first electronic mail address information satisfying the user query;

displaying a map including the first location;

displaying an indicator on the map at the first location identifying the first business name;

receiving a request to electronically mail the information to the first business name; and electronically mailing the information to the first business name using the first electronic mail address information.

13. A communication system, comprising:

a communication network;

a server system coupled to the communication network, the server system configured to store business information, the business information including business names, corresponding locations, and corresponding fax numbers;

a client system coupled to the communication network, the client configured to send a first request to the server system having at least a portion of a first business name;

the server further configured to identify from the stored business information the first business name, a corresponding first location, and a corresponding first fax number based on the first request, the server further configured to generate mapping information including the first location and an indicator at the first location identifying the first business name;

the client system configured to receive the mapping information from the server system, to display the mapping information, and to send a second request to the server system to fax a document to the first business name; and the server system configured to fax the document to the first business name using the first fax number.

14. A communication system, comprising:

a communication network;

a server system coupled to the communication network, the server system configured to store business information, the business information including business names, corresponding locations, and corresponding electronic mail address information;

a client system coupled to the communication network, the client configured to send a first request to the server system having at least a portion of a first business name;

the server further configured to identify from the stored business information the first business name, a corresponding first location, and a corresponding first electronic mail address information based on the first request, the server further configured to generate mapping information including the first location and an indicator at the first location identifying the first business name;

the client system configured to receive the mapping information from the server system, to display the mapping information, and to send a second request to the server system to electronically mail information to the first business name; and the server system configured to electronically mail the information to the first business name using the first electronic mail address information.

15. A computer program product for faxing a document, comprising:
- code for storing business information in a database, the business information including business names, corresponding locations, and corresponding fax numbers;
- code for receiving a user query having at least a portion of a business name;
- code for identifying from the database a first business name, a corresponding first location, and a corresponding first fax number satisfying the user query;
- code for displaying a map including the first location;
- code for displaying an indicator on the map at the first location identifying the first business name;
- code for receiving a request to fax the document to the first business name;
- code for faxing the document to the first business name using the first fax number; and
- a computer-readable storage medium for storing the codes.

16. A computer program product for electronically mailing information, comprising:
- code for storing business information in a database, the business information including business names, corresponding locations, and corresponding electronic mail address information;
- code for receiving a user query having at least a portion of a business name;
- code for identifying from the database a first business name, a corresponding first location, and a corresponding first electronic mail address information satisfying the user query;
- code for displaying a map including the first location;
- code for displaying an indicator on the map at the first location identifying the first business name;
- code for receiving a request to electronically mail the information to the first business name;
- code for electronically mailing the information to the first business name using the first electronic mail address information; and
- a computer-readable storage medium for storing the codes.

* * * * *